United States Patent
Ostrander et al.

(10) Patent No.: US 6,996,893 B1
(45) Date of Patent: Feb. 14, 2006

(54) METHOD OF ASSEMBLING A PLURALITY OF DISK DRIVES

(75) Inventors: Daniel R. Ostrander, Lake Forest, CA (US); William W. Garrett, Rancho Santa Margarita, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 251 days.

(21) Appl. No.: 10/741,648

(22) Filed: Dec. 19, 2003

(51) Int. Cl.
*G11B 5/27* (2006.01)
*H04R 31/00* (2006.01)

(52) U.S. Cl. .............. 29/603.03; 29/603.04; 29/603.05; 29/603.07

(58) Field of Classification Search ............. 29/603.03, 29/603.04, 603.05, 603.07; 360/97.02
See application file for complete search history.

(56) References Cited

U.S. PATENT DOCUMENTS

| | | | | | |
|---|---|---|---|---|---|
| 4,709,812 A | * | 12/1987 | Kosterka | ............... | 206/308.1 |
| 4,919,287 A | * | 4/1990 | Haskett et al. | ............... | 211/40 |
| 5,011,016 A | * | 4/1991 | Ozeki | ............... | 206/456 |
| 5,771,019 A | * | 6/1998 | Wachs et al. | ............... | 342/442 |

\* cited by examiner

*Primary Examiner*—A. Dexter Tugbang
*Assistant Examiner*—Tai Van Nguyen

(57) ABSTRACT

A method of assembling a plurality of disk drives comprising providing an assembly-plate comprising a plate alignment feature (PAF) and a plurality of cells wherein each cell has a cell alignment feature (CAF) and is adapted to receive and retain a disk drive; determining a valid alignment of the assembly-plate in relation to a disk drive assembly device based on PAF; selecting a disk drive for assembly; determining a valid alignment of a selected cell in relation to disk drive assembly device based on CAF of selected cell; placing an initial component of selected disk drive in selected cell wherein the initial component is retained by the cell via a retention feature of cell; repeating the selecting, determining a valid alignment of a selected cell, and placing for each of disk drives; and completing the assembling of each disk drive during which each disk drive remains in its cell.

14 Claims, 3 Drawing Sheets

METHOD OF ASSEMBLING A PLURALITY OF DISK DRIVES

FIELD OF THE INVENTION

This invention relates to disk drive assembly. More particularly, the present invention is directed to assembly of a plurality of disk drives.

BACKGROUND OF THE INVENTION

Disk drives are commonly employed in workstations, personal computers, portables and other computer systems to store large amounts of data in a readily available form. One class of disk drive in use today is the miniaturized disk drive, such as those having disk diameters of 1.8 inches or less which provide for storage of data in increasingly smaller and more portable electronic equipment, such as cell phones and personal digital assistants (PDA).

The small size of the miniaturized disk drives, however, mandates extra precision in their assembly, particularly in light of their correspondingly miniaturized components. To reduce the occurrence of human error during the assembly process, manufacturers may need to increasingly rely on the use of automated devices, such as assembly robots, for assembling the miniaturized disk drives. The assembly process for the drives, however, may require that the drives be transported from one assembly station to another. This movement of partially assembled drives during the various stages of the manufacturing process increases the susceptibility of the drives to adverse external influences, such as making them increasingly vulnerable to electrostatic discharges (ESD). As such, considerable care must be exercised during the movement of the disk drives to guard against such influences, resulting in added delay, cost and other overhead in the assembly of the miniaturized disk drives. As the automated assembly process is intended for high volume production, the foregoing transportation overhead becomes an increasing concern.

Accordingly, what is needed is a method for reducing the foregoing transportation overhead during the assembly of miniaturized disk drives.

SUMMARY OF THE INVENTION

This invention can be regarded as a method of assembling a plurality of disk drives. The method comprising providing an assembly-plate comprising a plate alignment feature (PAF) and a plurality of cells wherein each cell has a cell alignment feature (CAF) and is adapted to receive and retain a disk drive; determining a valid alignment of the assembly-plate in relation to a disk drive assembly device based on the PAF; selecting a disk drive for assembly if the assembly-plate is in valid alignment; and determining a valid alignment of a selected cell in relation to the disk drive assembly device based on the CAF of the selected cell.

The method further comprises placing an initial component of the selected disk drive in the selected cell wherein the initial component is retained by the cell via a retention feature of the cell, repeating the selecting, the determining a valid alignment of a selected cell, and the placing for each disk drive in the plurality of disk drives; and completing the assembling of each disk drive during which each disk drive remains in its cell.

DETAILED DESCRIPTION OF THE INVENTION

Figure 1:
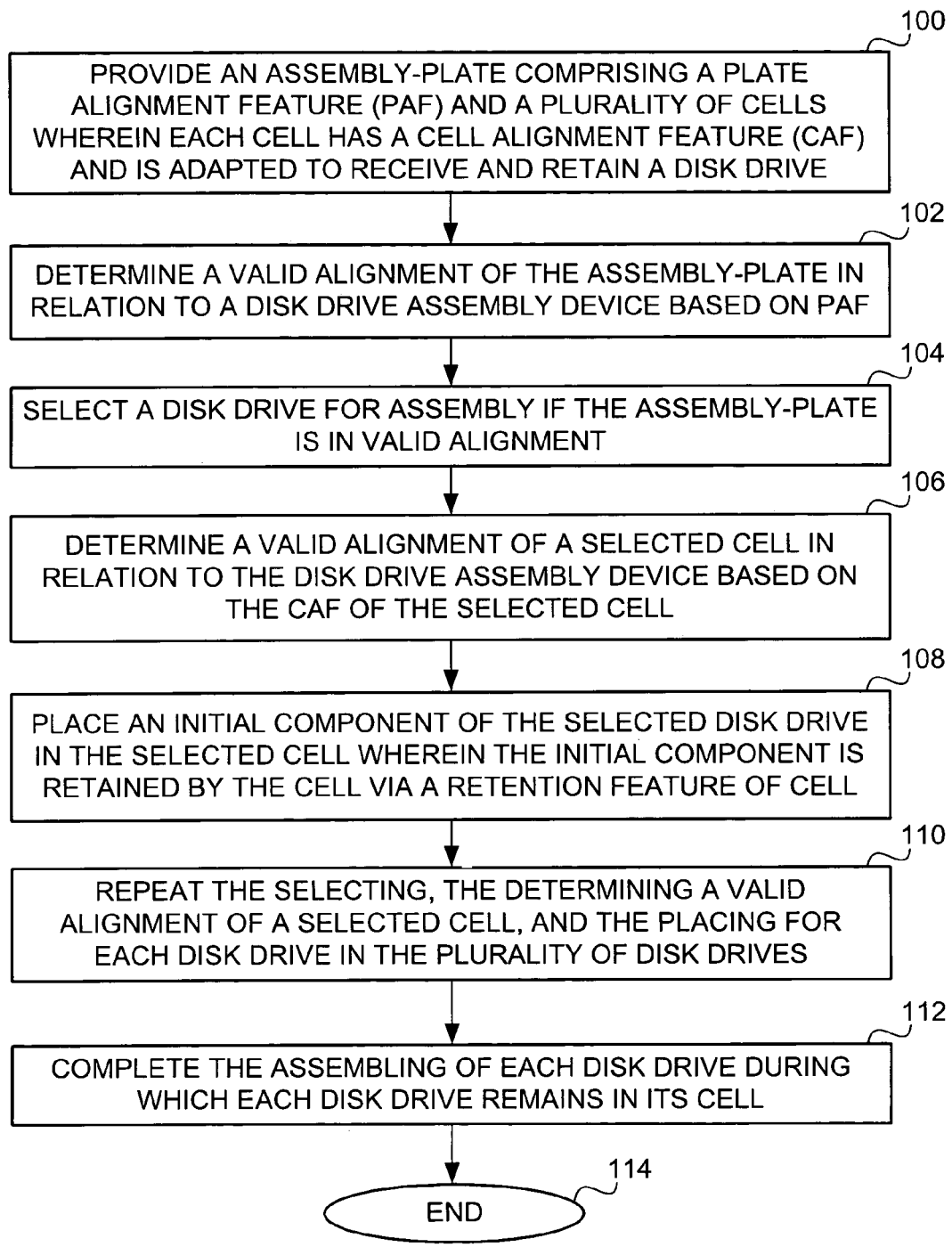
FIG. 1 is a flow chart illustrating a process used in the present invention.
Figure 2A:
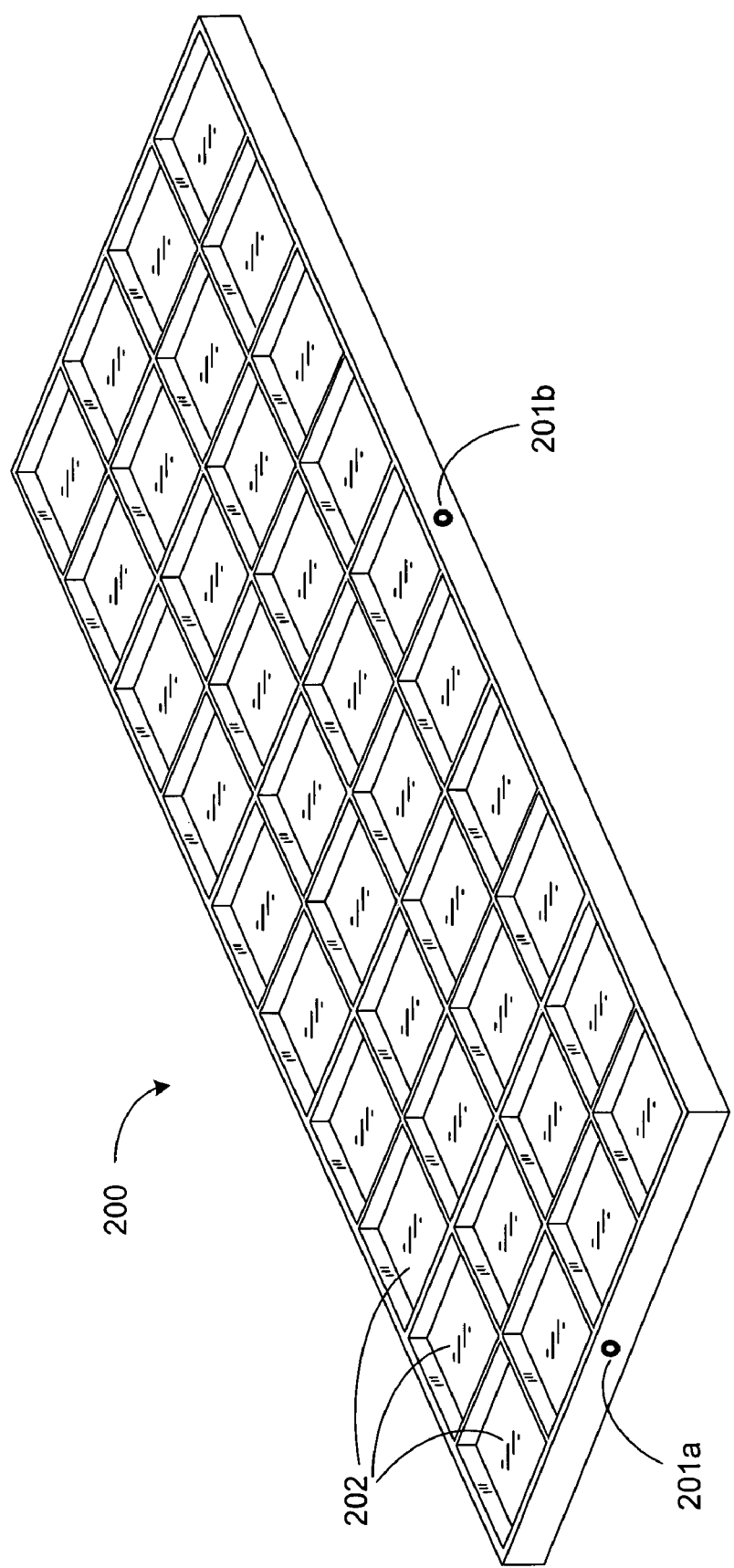
FIGS. 2A–B illustrate an exemplary cell matrix of the present invention.
Figure 2B:
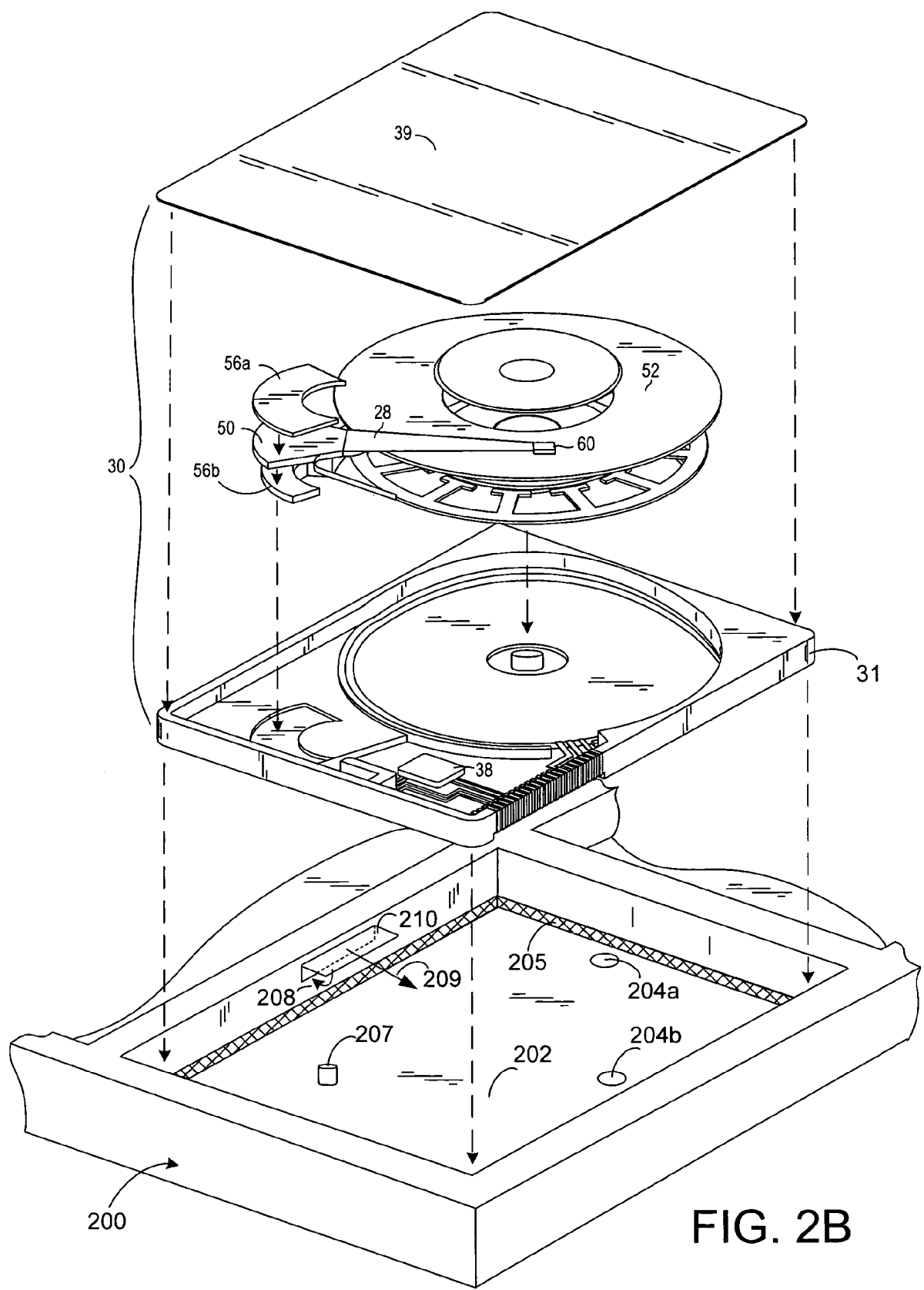

With reference to FIG. 1, a flow chart is shown which in conjunction with FIGS. 2A–B illustrates an exemplary method of the present invention for assembling a plurality of disk drives. As shown, the process begins in block 100 in which an assembly-plate 200 is provided. As shown in FIG. 2A, the assembly-plate 200 comprises a plate alignment feature (PAF), such as PAFs 201a and 201b, and a cell matrix in the form of plurality of cells 202 wherein as shown in FIG. 2B, each cell 202 has a cell alignment feature (CAF), such as CAFs 204a and 204b, and is adapted to receive and retain a disk drive 30. Suitably, the assembly-plate 200 is an injection molded or a cast assembly-plate.

Next, in block 102, a valid alignment of the assembly-plate 200 in relation to a disk drive assembly device (not shown) such as an assembly robot, is determined based on the PAFs 201a and 201b. In an exemplary embodiment, PAFs 201a and 201b serve as peripheral locating points that collectively identify the position of the assembly-plate 200, such as in respect to predetermined assembly-line representations of x-axis and y-axis in a Cartesian coordinate system. Suitably, PAFs 201a and 201b are optically readable, such as by an optical eye of the disk drive assembly device. In one embodiment, PAFs 201a and 201b are attached to the assembly-plate 200, such as via an adhesive or other forms of attaching well known in the art. In another embodiment, PAFs 201a and 201b are integrally formed on the assembly-plate 200, such as by molding, impressing, or other forms of integral forming well known in the art.

Next, in block 104, a disk drive 30 is selected for assembly if the assembly-plate 200 is determined to be in valid alignment. In block 106, a valid alignment of a selected cell 202 in relation to the disk drive assembly device is determined based on the CAFs 204a and 204b of the selected cell, as shown in FIG. 2B. In an exemplary embodiment, CAFs 204a and 204b collectively represent the position of the cell 202, such as in respect to predetermined assembly-line representations of x-axis and y-axis in a Cartesian coordinate system. Suitably, CAFs 204a and 204b are optically readable, such as by an optical eye of the disk drive assembly device. In one embodiment, CAFs 204a and 204b are attached to the corresponding cell 202, such as via an adhesive or other forms of attaching well known in the art. In another embodiment, CAFs 204a and 204b are integrally formed on the corresponding cell 202, such as by molding, impressing, or other forms of integral forming well known in the art.

Next, in block 108, an initial component of the selected disk drive 30 is placed in the selected cell 202. As shown in the exploded perspective view of FIG. 2B, the components of a disk drive 30 include disk drive base 31 and cover 39 which together are adapted to house a disk 52, a head stack assembly 28 having a head element 60, magnets 56a and 56b positioned to interact with the coil portion 50 to form a voice coil motor, and preamplifier 38. In one embodiment of the present invention, the initial component of each selected disk drive 30 is the disk drive base 31. Suitably, disk drive 30 is a miniaturized disk drive adapted to house a disk 52 which has a diameter of less than or equal to 1.8 inches.

Once placed in cell 202, the initial component is then retained by a retention feature of the cell 202. In one embodiment, the retention feature comprises a pin 207 adapted to retain the initial component of each disk drive 30, such as via pairing with a cavity (not shown) in the disk drive base 31 adapted to receive the pin 207 for retaining the disk drive base 31. In another embodiment, the retention feature comprises a leaf spring 210 adapted to retain the initial component of each disk drive 30. In this embodiment, the placement of the disk drive base 31 forces the leaf spring 210 into a closed position along the direction shown by arrow 208, where-after the leaf spring 210 exerts a spring force on the placed disk drive base 31 along the direction shown by arrow 209 to retain the disk drive base 31 within the cell. It should be noted that other retaining features well known in the art may be used with or in the place of the pin 207 or leaf spring 201 and are contemplated to be within the scope of the present invention.

Suitably, the assembly-plate 200 further comprises a shunt feature 205 well known in the art for protecting the disk drives 30 from electrostatic discharges during the assembly process of the disk drives 30. The shunt feature 205, as shown in FIG. 2B, may be attached to or integrally formed on the cell 202.

Next, in block 110, the selecting process of block 104, the determining process of block 106, and the placing process of block 108 is repeated for each disk drive 30 in the plurality of disk drives. Next, in block 112, the assembling of each disk drive 30 is completed during which each disk drive 30 remains in its corresponding cell 202. As shown in FIG. 2B, the assembly process is suitably a top-down assembly of the various aforementioned components of the disk drive 30, beginning with the placement of disk drive base 31 and ending with disk drive cover 39. Returning to FIG. 1, the flow then proceeds to block 114 in which the overall process ends.

One advantage of the foregoing feature of the present invention over the prior art is by using a cell matrix assembly-plate to house and retain a plurality of disk drives throughout the completion of the assembly of the disk drives, the overheads associated with moving individual disk drives between assembly stations are reduced.

It should be noted that the various features of the foregoing embodiments were discussed separately for clarity of description only and they can be incorporated in whole or in part into a single embodiment of the invention having all or some of these features.

What is claimed is:

1. A method for assembling a plurality of disk drives, the method comprising:

providing an assembly-plate comprising a plate alignment feature (PAF) and a plurality of cells wherein each cell has a cell alignment feature (CAF) and is adapted to receive and retain a disk drive;

determining a valid alignment of the assembly-plate in relation to a disk drive assembly device based on the PAF;

selecting a disk drive for assembly if the assembly-plate is in valid alignment;

determining a valid alignment of a selected cell in relation to the disk drive assembly device based on the CAF of the selected cell;

placing an initial component of the selected disk drive in the selected cell wherein the initial component is retained by the cell via a retention feature of the cell;

repeating the selecting, the determining a valid alignment of a selected cell, and the placing for each disk drive in the plurality of disk drives; and completing the assembling of each disk drive during which each disk drive remains in its cell.

2. The method as claimed in claim 1, the assembly-plate further comprising a shunt feature for protecting the disk drives from electrostatic discharges during the assembly process of the disk drives.

3. The method as claimed in claim 1, wherein the initial component of each selected disk drive is a disk drive base.

4. The method as claimed in claim 1, wherein the retention feature of each cell comprises a pin adapted to retain the initial component of each disk drive.

5. The method as claimed in claim 1, wherein the retention feature of each cell comprises a leaf spring adapted to retain the initial component of each disk drive.

6. The method as claimed in claim 1, wherein the PAF is optically readable.

7. The method as claimed in claim 1, wherein the PAF is attached to the assembly-plate.

8. The method as claimed in claim 1, wherein the PAF is integrally formed on the assembly-plate.

9. The method as claimed in claim 1, wherein each CAF is optically readable.

10. The method as claimed in claim 1, wherein each CAF is attached to a corresponding cell.

11. The method as claimed in claim 1, wherein each CAF is integrally formed on a corresponding cell.

12. The method as claimed in claim 1, wherein the assembly-plate is an injection molded assembly-plate.

13. The method as claimed in claim 1, wherein the assembly-plate is a cast assembly-plate.

14. The method as claimed in claim 1, wherein each disk drive comprises a disk less than or equal to 1.8 inches in diameter.

* * * * *